(No Model.)
P. P. GLOR.
MEANS FOR OPERATING VAT COVERS.
No. 370,694. Patented Sept. 27, 1887.
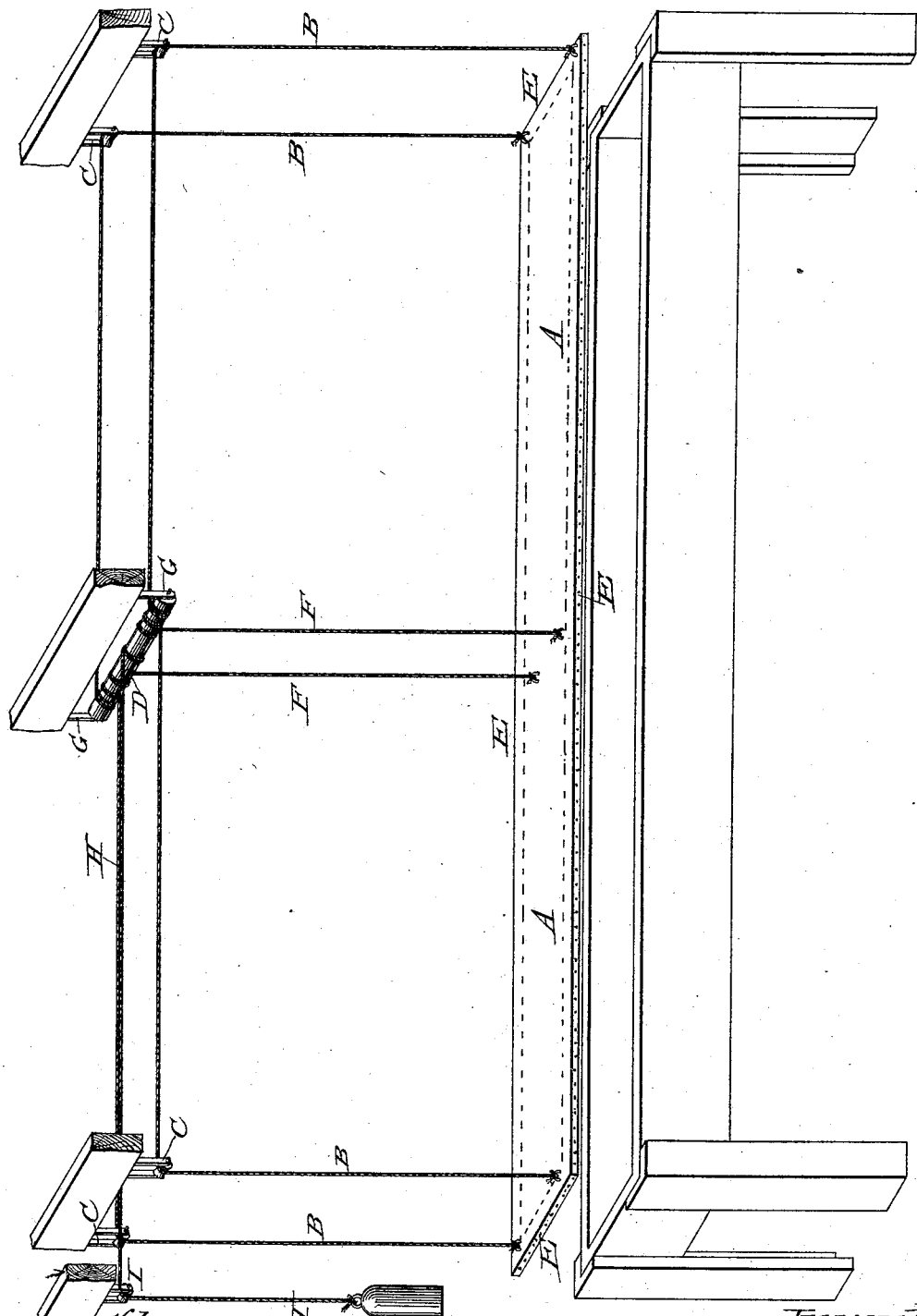
Witnesses:
Samuel S. Kennedy
Charles F. Bauer
Inventor.
Peter P. Glor

UNITED STATES PATENT OFFICE.

PETER P. GLOR, OF VARYSBURG, NEW YORK.

MEANS FOR OPERATING VAT-COVERS.

SPECIFICATION forming part of Letters Patent No. 370,694, dated September 27, 1887.

Application filed October 2, 1885. Serial No. 178,813. (No model.)

*To all whom it may concern:*

Be it known that I, PETER P. GLOR, a citizen of the United States, residing at Varysburg, in the county of Wyoming and State of New York, have invented an Improvement in Means for Operating Vat-Covers, useful in covering vats where the covers are necessarily large or heavy, causing them to be inconvenient and difficult to manage and control, of which the following is a specification.

The object of my improvement is to secure a more perfect cover, not liable to become displaced while in use, and when removed to be out of the way and leaving it in a convenient position for replacing on the vat.

Heretofore cheese-vats have usually been covered by placing loose sticks across the vat and then spreading a cloth upon said sticks. The sticks are liable to become displaced by the spreading of the cloth upon them, or by a person's clothing coming in connection with them in passing by or near the vats, thereby dropping the cloth into the milk or whey and curd. The vat is also liable to become uncovered by a current of air when a door is left ajar. This uncertain and inconvenient mode of covering cheese-vats ofttimes induces and sometimes compels cheese-makers to leave the vat uncovered to the injury of the curd or cheese. It is a generally-accepted theory that after the process of coagulation begins the milk should be excluded from the air, as far as practicable, until it is developed into ripened curd ready for the press. While the milk is undergoing this transformation, it is necessary to frequently examine its condition, to ascertain what treatment it requires. It is also necessary to work the milk or curd at certain stages during the transformation. My improvement greatly assists the cheese-maker in keeping the milk or curd at its proper temperature and to make all necessary examinations and to work the curd at the intervals required without undue exposure. I attain these objects by the mechanism illustrated in the accompanying drawing, which illustrates my invention in perspective.

The cover A A is made of suitable material, preferably of cloth, tacked to a frame, E E E E. The cover is raised from and lowered onto the vat by means of cords and pulleys, arranged as shown in the drawing, and hereinafter described.

Pulleys C C C C are fastened to the ceiling directly above the four corners of the vat, and about midway between the two pairs of end pulleys is a roller or drum, D, which is mounted and sustained in suitable bearings or hangers, G G, also attached to the ceiling or joists.

Cords B B B B are attached to the four corners of the cover, and, passing over the pulleys C C C C, are wound upon the roller or drum D, the two cords attached to one end of the cover winding under the roller and those attached to the other end winding over. Thus, when the roller is turned in either direction all the cords are either wound up or unwound, and the cover either raised or lowered, according to the direction in which the roller is turned.

H represents a cord, which passes over a pulley, I, also attached to the ceiling, and which is wound upon the roller D in a direction opposite to that in which the cords B B B B are wound. This is for the purpose of rotating the roller, which is effected by pulling upon the cord H, whereby, as the latter unwinds, the roller is turned in a direction to wind up the cords B B B B, and thus raise the cover from the vat.

To the free end of the cord H, I attach a weight, I, sufficient to counterbalance the cover, and this serves to hold the cover in elevated position at any point without any other means for attaching or holding the cord.

In the case of long covers, where it is necessary to support the center in order to prevent sagging or breaking, intermediate cords, F F, may be attached and arranged to be wound upon and unwound from the roller D simultaneously with the cords B B B B.

I am aware that it is not broadly new to operate vat-covers by means of cords passed over pulleys and wound upon drums; but in all such cases of which I have knowledge special means were provided for locking or securing the drum in order to hold the cover in elevated position; also, as a means for raising and lowering pans or vats, cords, pulleys, and weights have heretofore been proposed, but I am not aware that in such cases a winding-drum has ever been used. I therefore do not wish to claim any of these devices, broadly, but restrict my claims to the combinations and arrangements herein shown and described.

What I claim as my invention is—

As a means for raising and lowering vat-covers and suspending the same above the vats, the cords B B B B, attached at or near the corners of the covers and passing over pulleys arranged vertically above the points of attachment, in combination with a roller located between the cords and upon which they are wound from opposite directions, and a cord, H, also wound upon said roller or drum, but in a direction opposite to that in which the cords B B B B are wound, and a counter-weight attached to the free end of said cord H, substantially as and for the purpose shown and described.

PETER P. GLOR.

Witnesses:
  HENRY MERKLE,
  GEORGE P. BAUER.